United States Patent [19]

German

[11] Patent Number: 5,161,783
[45] Date of Patent: Nov. 10, 1992

[54] FENCE RAIL CONNECTION

[76] Inventor: Rex L. German, Box 45, Cozad, Nebr. 69130

[21] Appl. No.: 771,639

[22] Filed: Oct. 4, 1991

[51] Int. Cl.$^5$ .......................................... E04H 17/14
[52] U.S. Cl. ...................................... 256/19; 256/65; 256/66; 403/192; 403/263
[58] Field of Search ............................ 256/65, 66, 19; 403/243, 263, 194, 201, 192; 182/228

[56] References Cited

U.S. PATENT DOCUMENTS

| | | | |
|---|---|---|---|
| 2,783,029 | 2/1957 | Fisher et al. | 256/19 |
| 3,318,413 | 5/1967 | Werner et al. | 182/228 |
| 3,327,385 | 6/1967 | Shaver | 182/228 |
| 3,484,827 | 12/1969 | Hall | 256/65 X |
| 3,591,213 | 7/1971 | Turner | 182/228 X |
| 3,822,053 | 7/1974 | Daily | 256/65 X |
| 4,195,888 | 4/1980 | Squire | 403/263 X |
| 4,656,721 | 4/1987 | Werner | 182/228 X |
| 4,722,514 | 2/1988 | Pettit | 256/66 X |
| 4,967,879 | 11/1990 | Klats | 182/228 |

FOREIGN PATENT DOCUMENTS

| | | | |
|---|---|---|---|
| 808033 | 3/1969 | Canada | 182/228 |
| 6322 | 1/1980 | European Pat. Off. | 256/65 |
| 0359054 | 3/1990 | European Pat. Off. | 182/228 |
| 1431719 | 2/1966 | France | 403/263 |

*Primary Examiner*—Randolph A. Reese
*Assistant Examiner*—Heather Chun
*Attorney, Agent, or Firm*—Zarley, McKee, Thomte, Voorhees & Sease

[57] ABSTRACT

The fence rail and post connection of the present invention includes a hollow tubular PVC post with an opening formed in one vertical wall to receive a hollow tubular PVC fence rail. A hollow tubular PVC sleeve has flanges formed on the forward and rearward ends of the sleeve and is mounted within the post in alignment with the opening and the post wall. The sleeve is affixed within the post and a rail is then inserted through the opening and into the sleeve and affixed in position to form a rigid connection between the rail and post.

5 Claims, 2 Drawing Sheets

FENCE RAIL CONNECTION

TECHNICAL FIELD

The present invention relates generally to fence railing manufactured of plastic, and more particularly to an improved connection of fence rail to a fence post.

BACKGROUND OF THE INVENTION

Wood rail fencing has traditionally been utilized for many years to enclose areas of real estate. Typically, the main purpose of such fencing is to enclose and retain animals within a given space.

A relatively recent development in this field has been the use of polyvinyl chloride (PVC) compounds in manufacturing fence components. PVC fence rail and posts are impervious to deterioration from moisture, temperature extremes, ultraviolet exposure, etc. Furthermore, the smooth surface and flexibility of the PVC fence components assist in reducing injury to animals that come into contact with the fencing.

Conventionally, PVC fencing utilizes a bracket which is mounted on the side of the fence posts to support a rail extending through the bracket. In this fashion, the rail brackets conceal a rail joint to prevent animal injury. The main problem with conventional plastic fencing components is in the provision of a strong yet simple connection of a rail to a post in manufacturing a gate component. A strong rigid connection is needed which is generally centered on the post. Further, the connection must enable the manufacturer to provide standard and customized length gate components.

It is therefore a general object of the present invention to provide an improved connection of a plastic fence rail with a plastic fence post.

Another object of the present invention is to provide an improved fence rail and post connection which is strong and secure.

A further object is to provide a plastic fence rail/post connection which is simple to manufacture and install.

Still another object of the present invention is to provide a plastic fence rail and post connection which permits customized gate lengths.

These and other objects will be apparent to those skilled in the art.

SUMMARY OF THE INVENTION

The fence rail and post connection of the present invention includes a hollow tubular PVC post with an opening formed in one vertical wall to receive a hollow tubular PVC fence rail. A hollow tubular PVC sleeve has flanges formed on the forward and rearward ends of the sleeve and is mounted within the post in alignment with the opening and the post wall. The sleeve is affixed within the post and a rail is then inserted through the opening and into the sleeve and affixed in position to form a rigid connection between the rail and post.

DESCRIPTION OF THE PREFERRED EMBODIMENT

Figure 1:
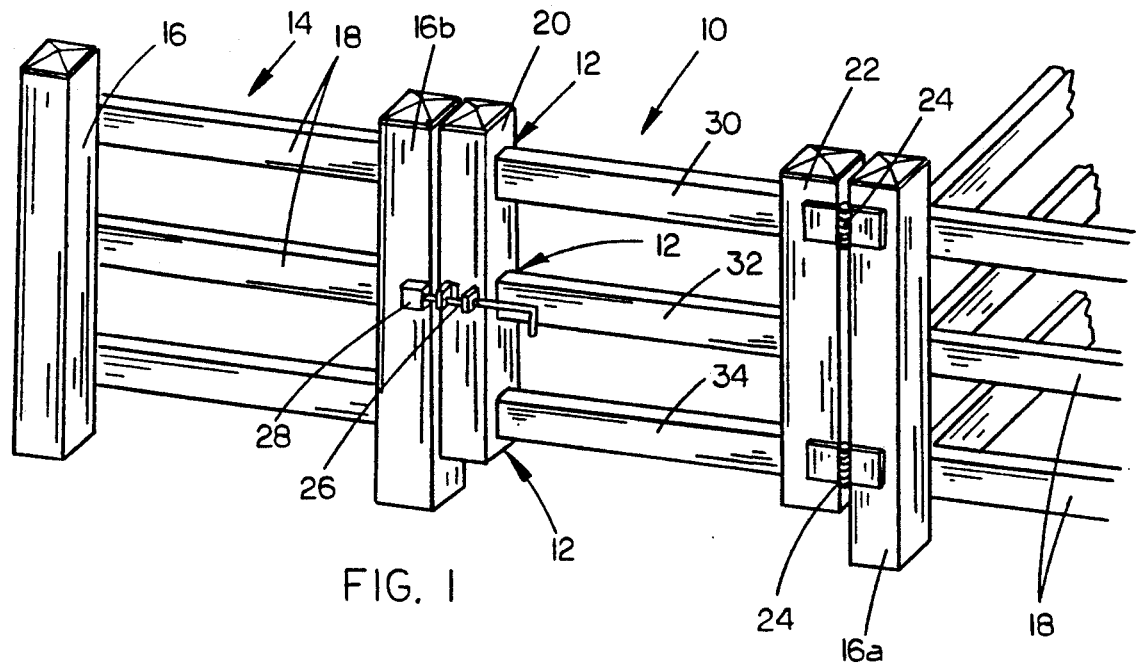
FIG. 1 is a perspective view of a conventional plastic fence with the rail and post connection of the present invention installed in a gate operably mounted in the conventional fence.

Referring now to the drawings, in which similar or corresponding parts identified with the same reference numeral, and more particularly to FIG. 1, a fence gate is designated generally at 10, which utilizes the rail and post connections 12 of the present invention. Gate 10 is installed in a line of conventional fence 14 of the type utilizing vertical fence post 16 with rail 18 connected to the sides thereof.

Gate 10 includes a pair of gate posts 20 and 22 which are shorter than conventional fence post 16. Gate post 22 has a pair of hinges 24 mounted thereon connected thereto an adjacent fence post 16, to pivotally connect fence gate 10 with fence 14. An operable gate latch 26 is mounted on gate post 20, and will selectively lock into a bracket 28 mounted on the adjacent fence post 16b so as to selectively lock gate 10 with respect to fence 14. Gate 10 also includes an upper fence rail 30 intermediate fence rail 32 and lower fence rail 34 connected between gate posts 20 and 22 in parallel spaced-apart fashion.

Figure 2:
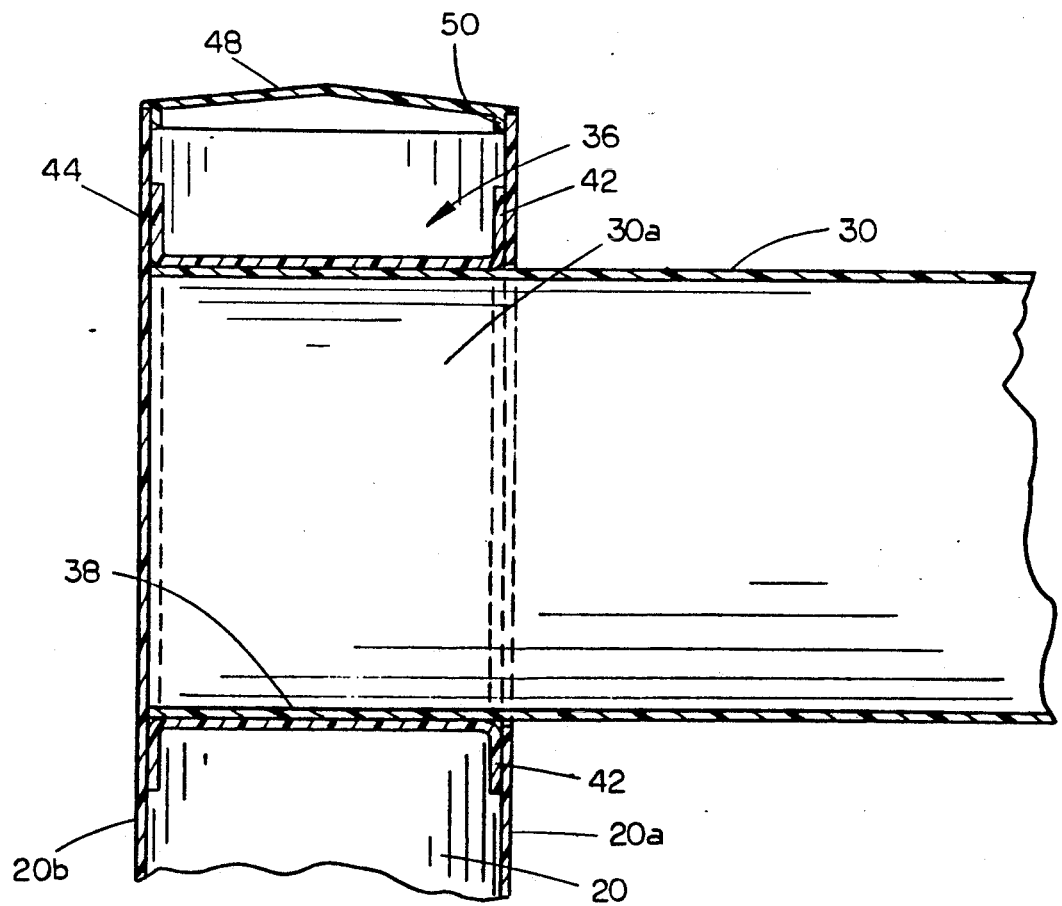
FIG. 2 is a vertical sectional view through the upper portion of the rail and post connection of the present invention.
Figure 3:
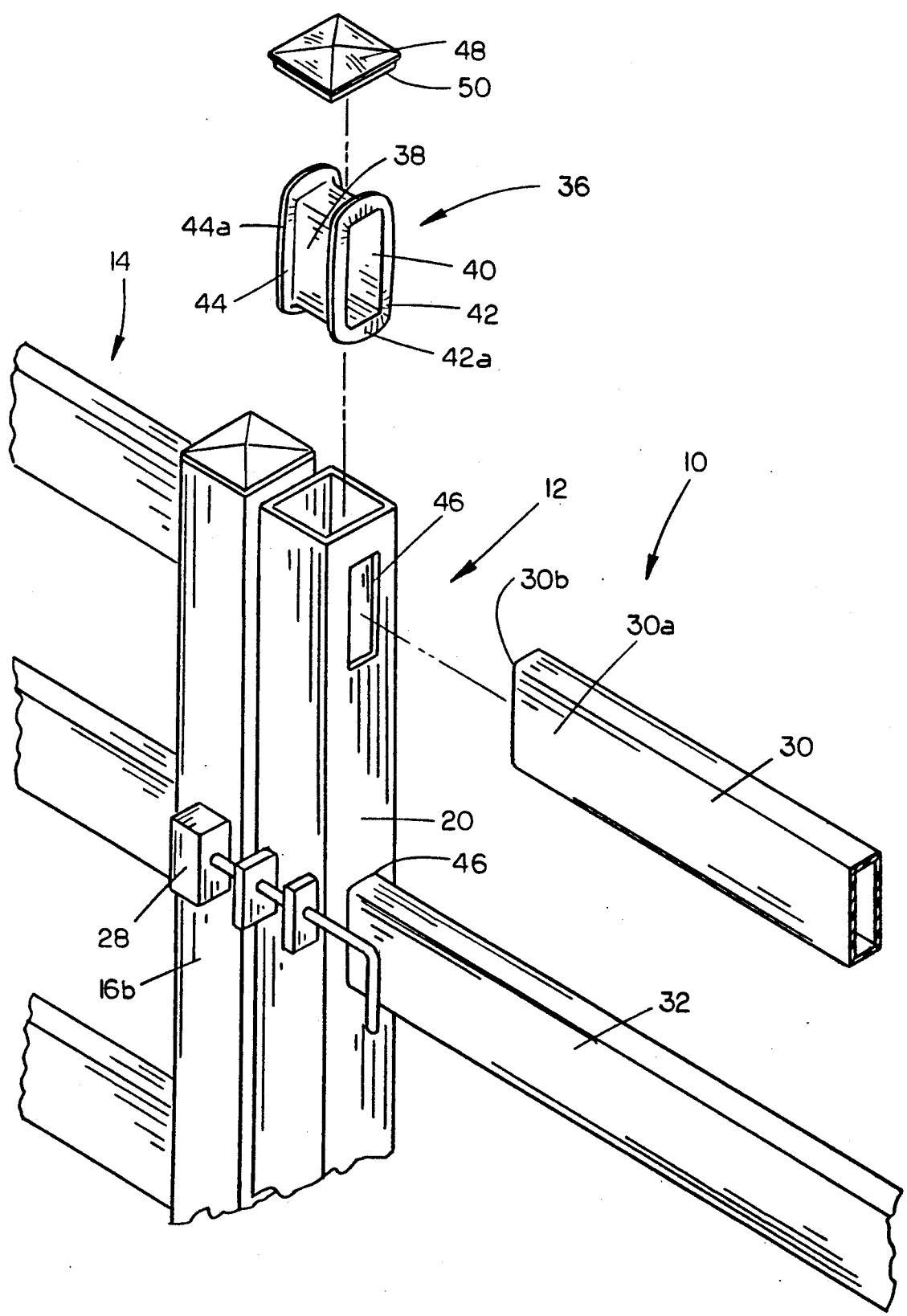
FIG. 3 is an exploded perspective view of the rail and post connection of the present invention.

Referring now to FIGS. 2 and 3, the rail and post connection 12 of the present invention utilizes a special sleeve 36 designed to slide within the interior of the hollow tubular gate post 20 to receive one end 30a of upper fence rail 30. Sleeve 36 includes a generally hollow tubular body 38 having an interior surface and cross-section adapted to snugly receive one end 30a of upper rail 30 therein. Tubular body 38 has a flared forward end which forms a forward flange 42 and a flared rearward end forming a rearward flange 44.

The length of sleeve 36, as measured from the front face of forward flange 42 to the rearward face of rearward flange 44, is adapted to snugly fit the interior of gate post 20. Similarly, the width of flanges 42 and 44 is adapted to snugly fit within the interior of gate post 20.

To create a fence gate, gate post 20 and 22 are cut to the appropriate height, and then three rectangular openings 46 are formed therein to receive upper, intermediate and lower rails 30, 32 and 34. Adhesive is then applied to the forward face 42a of flange 42 and the rearward face 44a of flange 44. Sleeve 36 is then inserted into hollow gate post 20 such that the interior opening 40 aligns with one of openings 46. Adhesive is then applied to end 30a of upper rail 30 and rail 30 is inserted through opening 46 and into sleeve 36 until the end surface 30b contacts the rearward wall 20b of gate post 20. The same procedure is applied to rails 32 and 34 and to gate post 22.

A cap 48 is provided with a depending lip 50 which fits the interior cross-section of gate post 20, as shown in FIG. 2, to give gate 10 a finished appearance. Gate latch 26 and hinges 24 may be applied to gate 10 as desired. In order to provide a strong connection, it is preferred that items such as gate latch 26 and hinges 24 be mounted with bolts or the like (not shown) extending through the rail and post connections 12 of the present invention.

Whereas the invention has been shown and described in connection with the preferred embodiment thereof, it will be understood that many modifications, substitutions and additions may be made which are within the intended broad scope of the appended claims There has therefore been shown and described an improved fence rail and post connection which accomplishes at least all of the above stated objects.

I claim:

1. A fence rail and post connection, comprising:
   a hollow tubular post having a lower end immovably fixed in ground having at least a forward wall and a rearward wall, said forward and rearward walls each having an interior and exterior surface;
   an opening formed in the forward wall of dimensions to receive a fence rail therethrough;
   a hollow tubular sleeve having a forward and rearward end, affixed entirely within the interior of said post with the hollow interior of said sleeve communicating with said opening, said sleeve interior having dimensions to receive one end of said fence rail therein; and
   said fence rail journaled through said opening and affixed in said sleeve to form a rigid connection between the rail and said post.

2. The fence rail and post connection of claim 1, wherein said sleeve includes a flange on the forward and rearward ends affixed to the interior surfaces of said forward and rearward walls of said post.

3. The connection of claim 2, wherein said flanges are flared ends of said sleeve.

4. The connection of claim 2, wherein said flanges and sleeve are a single integral unit.

5. A fence rail and post connection, comprising:
   a hollow tubular post having a lower end immovably fixed in ground having at least a forward wall with interior and exterior surfaces and a rearward wall with interior and exterior surfaces;
   an opening formed in the forward wall of dimensions to receive a fence rail therethrough;
   a hollow tubular sleeve having a forward and rearward end, affixed entirely within the interior of said post with the hollow interior having dimensions to receive one end of said fence rail therein;
   the forward end of said sleeve being affixed to the interior surface of the forward wall, and the rearward end being affixed to the interior surface of the rearward wall; and
   said fence rail journaled through said opening and affixed in said sleeve to form a rigid connection between the rail and said post.

* * * * *